(12) United States Patent
Yao

(10) Patent No.: US 9,044,717 B2
(45) Date of Patent: Jun. 2, 2015

(54) CENTRIFUGAL DEVICE

(75) Inventor: Jianguo Yao, Chiyoda-ku (JP)

(73) Assignee: THINKY CORPORATION, Tokyo (JP)

( * ) Notice: Subject to any disclaimer, the term of this patent is extended or adjusted under 35 U.S.C. 154(b) by 816 days.

(21) Appl. No.: 13/252,863

(22) Filed: Oct. 4, 2011

(65) Prior Publication Data

US 2012/0135846 A1 May 31, 2012

(30) Foreign Application Priority Data

Nov. 30, 2010 (JP) ................................ 2010-267269

(51) Int. Cl.
- *B01F 9/00* (2006.01)
- *B01F 15/06* (2006.01)
- *B02C 17/08* (2006.01)
- *B02C 17/18* (2006.01)

(52) U.S. Cl.
CPC ............. *B01F 9/0001* (2013.01); *B01F 15/065* (2013.01); *B02C 17/08* (2013.01); *B02C 17/1815* (2013.01)

(58) Field of Classification Search
CPC ............................... B01F 9/0001; B02C 17/08
USPC ........ 366/139, 209–219, 602; 433/49, 90, 91; 494/19
See application file for complete search history.

(56) References Cited

U.S. PATENT DOCUMENTS

| | | | | |
|---|---|---|---|---|
| 5,551,779 A | * | 9/1996 | Gantner et al. | 366/217 |
| 6,099,160 A | * | 8/2000 | Flackett | 366/217 |
| 6,755,565 B2 | * | 6/2004 | Flackett | 366/217 |
| 7,438,460 B2 | * | 10/2008 | Schmidt et al. | 366/139 |
| 8,092,075 B2 | * | 1/2012 | Ishii | 366/139 |
| 2007/0002682 A1 | | 1/2007 | Vanderbilt et al. | |
| 2007/0025180 A1 | | 2/2007 | Ishii | |
| 2012/0135846 A1 | * | 5/2012 | Yao | 494/13 |

FOREIGN PATENT DOCUMENTS

| | | | | |
|---|---|---|---|---|
| DE | 10 2006 049 347 A | | 4/2008 | |
| JP | 2001-269560 | | 10/2001 | |
| JP | 2002-143706 A | | 5/2002 | |
| JP | 2002224551 A | * | 8/2002 | ............... B01F 9/22 |
| JP | 2004243158 A | * | 9/2004 | ............... B01F 9/22 |
| JP | 4084493 B | | 2/2008 | |
| JP | 2008-119603 | | 5/2008 | |
| JP | 2009-208026 | | 9/2009 | |
| JP | 2010-194470 A | | 9/2010 | |
| WO | WO 2009/137480 A | | 11/2009 | |

* cited by examiner

*Primary Examiner* — Charles Cooley
(74) *Attorney, Agent, or Firm* — Rankin, Hill & Clark LLP

(57) ABSTRACT

A centrifugal device capable of adjusting a temperature of a material. The centrifugal device applies centrifugal force on a contained material contained within a container by spinning the container while rotating the container. The centrifugal device includes: a rotating body rotating around a predetermined rotation axis line; a container holder that holds the container and is attached in a rotatable manner to the rotating body in a position that is a predetermined distance away from the rotation axis line of the rotating body; a compartment body that compartmentalizes a space including an area in which the rotating body rotates; one or a plurality of projection bodies that project from an inner surface of the compartment body towards the area in which the rotating body rotates; and a temperature adjustor that adjusts the temperature of the compartment body.

22 Claims, 10 Drawing Sheets

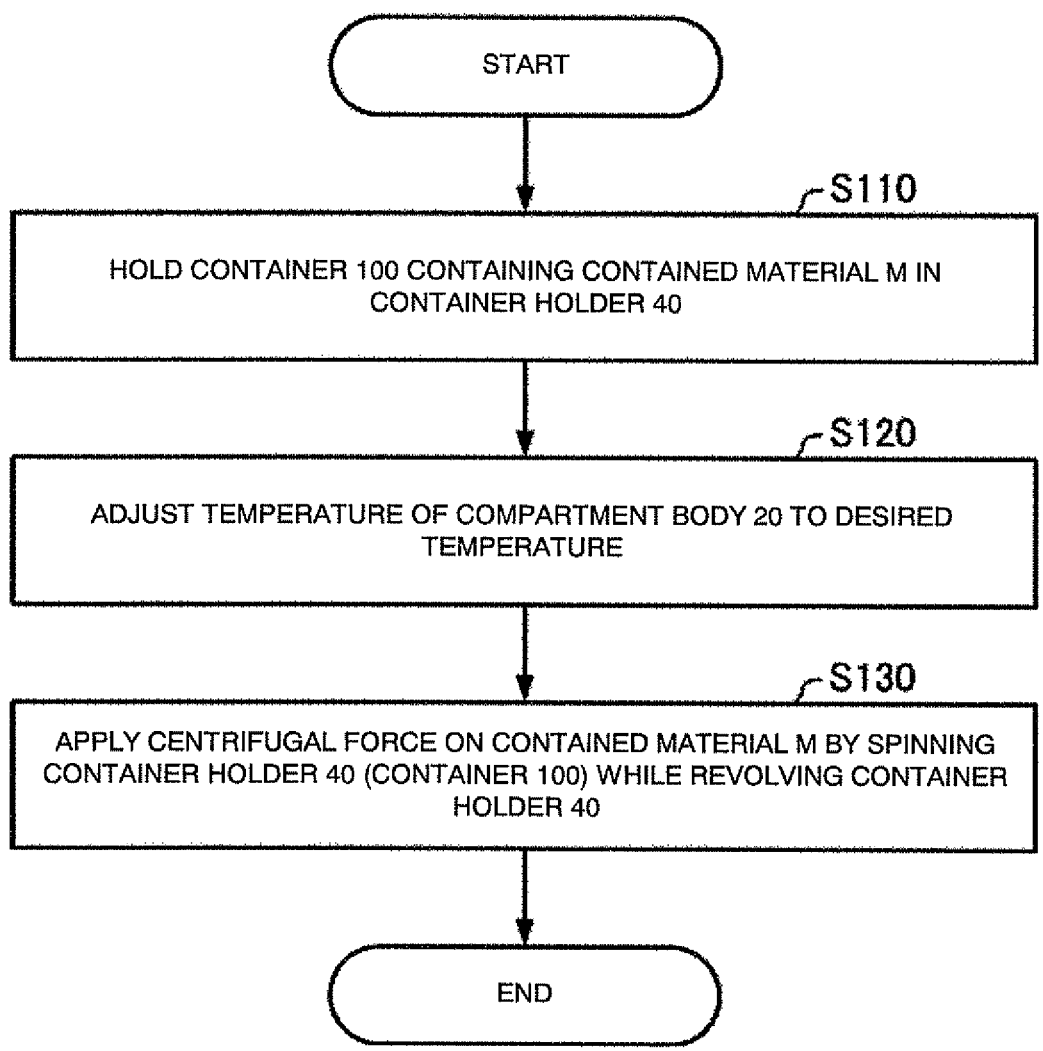

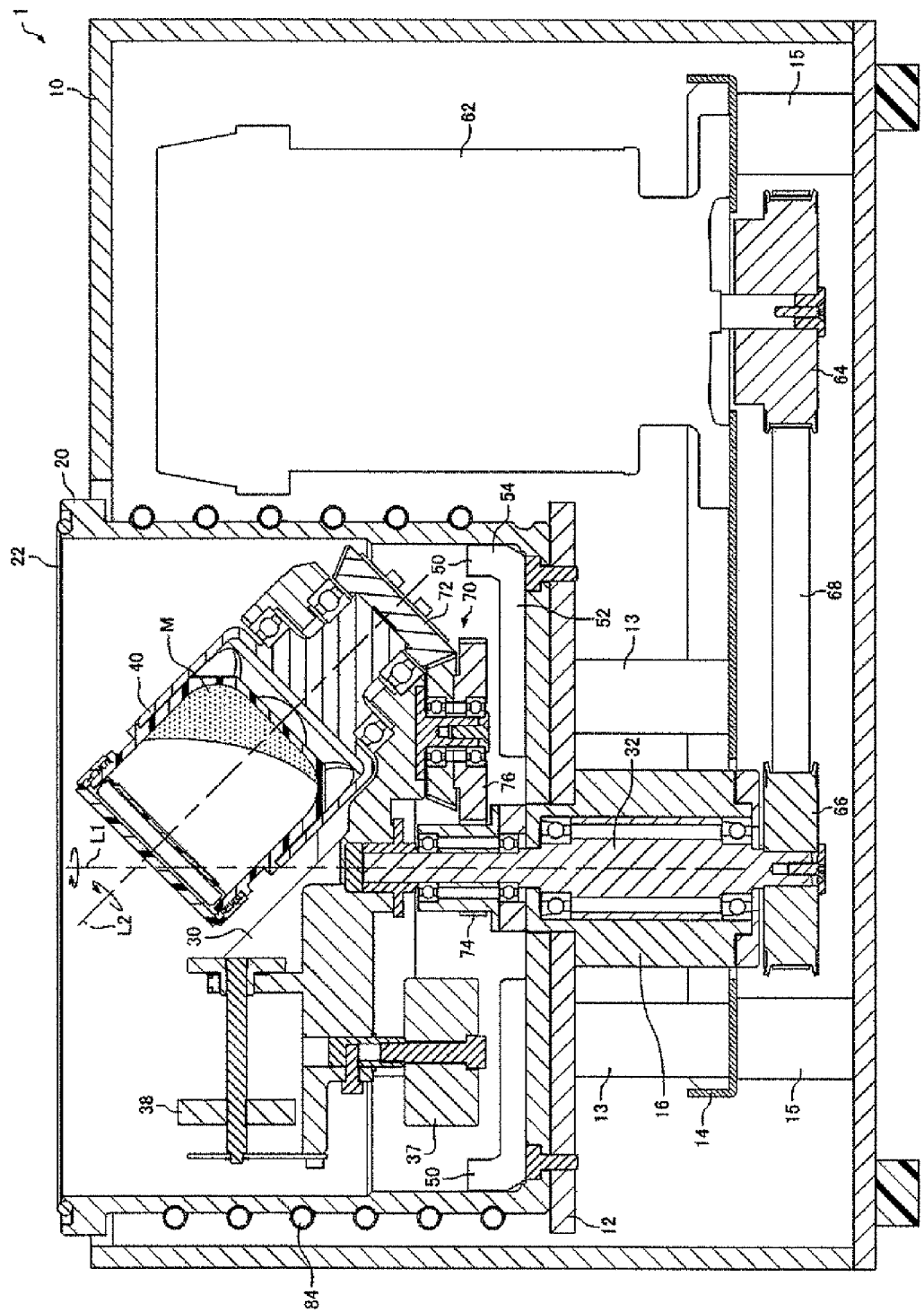

CENTRIFUGAL DEVICE

TECHNICAL FIELD

The present invention relates to a centrifuge that applies centrifugal force on a material. In particular, the present invention relates to a centrifuge that applies centrifugal force on a material by spinning a container containing the material while revolving the container.

BACKGROUND ART

A centrifuge (spinning and revolving type centrifuge) is known in which a container contains a material is spun while being revolved, thereby applying centrifugal force on the material. For example, as described in Patent Literature 1, the centrifuge is sometimes used as a stirring and defoaming device that simultaneously performs a stirring process and a defoaming process on the material. Alternatively, the centrifuge is sometimes used as a ball mill that grinds the material (refer to Patent Literature 2) or an emulsifier that emulsifies the material. (refer to Patent Literature 3).

Patent Literature 1: Japanese Patent Publication No. 4084493
Patent Literature 2; Japanese Patent Laid-open Publication No. 2002-143706
Patent Literature 3: Japanese Patent Laid-open Publication No. 2010-194470

DISCLOSURE OF INVENTION

Problem to be Solved by the Invention

With the increase in functionality of materials in recent years, the demand for temperature management of materials has been rising. In spinning and revolving type centrifuges as well, materials can be processed under more suitable conditions if the temperature of the material can be managed.

An object of an aspect of the present invention is to provide a centrifuge capable of adjusting temperature of a material.

Means for Solving Problem (1) An aspect of the present invention is a spinning and revolving type centrifuge that applies centrifugal force on a contained material contained within a container by spinning the container while rotating the container. The centrifuge includes: a rotating body configured to be capable of rotating around a predetermined rotation axis line; a container holder that holds the container and is attached in a rotatable manner to the rotating body in a position that is a predetermined distance away from the rotation axis line of the rotating body; a compartment body that compartmentalizes a space including an area in which the rotating body rotates; one or a plurality of projection bodies that project from an inner surface of the compartment body towards the area; and a temperature adjustor that adjusts the temperature of the compartment body.

According to the aspect, a centrifuge can be provided that is capable of performing a process for applying centrifugal force on a contained material contained in a container while adjusting temperature.

(2) In the centrifuge, the rotating body may have a compressing section that compresses air within the space towards the rotating direction of the rotating body.

(3) In the centrifuge, the projection body may have a shape that extends such as to intersect with a circumference of which the center is the rotation axis line.

(4) In the centrifuge, the projection body may be disposed near an outer periphery of the space.

(5) In the centrifuge, the projection body may be near the area.

(6) In the centrifuge, a through hole may be formed in a side surface of the container holder.

(7) In the centrifuge, the container holder may have a container supporting section that supports the container such that a bottom surface of the container is disposed at a distance from an inner bottom surface of the container holder; and the through hole in the container holder may be configured to expose space between the bottom surface of the container and the inner bottom surface of the container holder.

(8) In the centrifuge, the container supporting section may be an upper end of the container holder.

BRIEF DESCRIPTION OF DRAWINGS

FIG. 7 is a diagram for explaining a method of processing a contained material according to the present embodiment.
FIG. 8 is a diagram for explaining a processing state of the contained material according to the present embodiment.

BEST MODE (S) FOR CARRYING OUT THE INVENTION

An embodiment to which the present invention is applied will hereinafter be described in detail with reference to the drawings. However, the present invention is not limited to the embodiment below. In other words, not all configurations described according to the embodiment below are necessarily required for the present invention. The present invention includes configurations in which the following details are freely combined.

(1) Configuration of Centrifuge 1

A configuration of a centrifuge 1 according to a present embodiment will be described with reference to FIG. 1 to FIG. 4. The centrifuge 1 is a device that applies centrifugal force on a contained material M (material) contained within a container 100 by spinning the container 100 while revolving the container 100. For example, the centrifuge 1 is actualized as a device for stirring and defoaming, grinding, or emulsifying the contained material M.

(a) Casing 10

Figure 1:
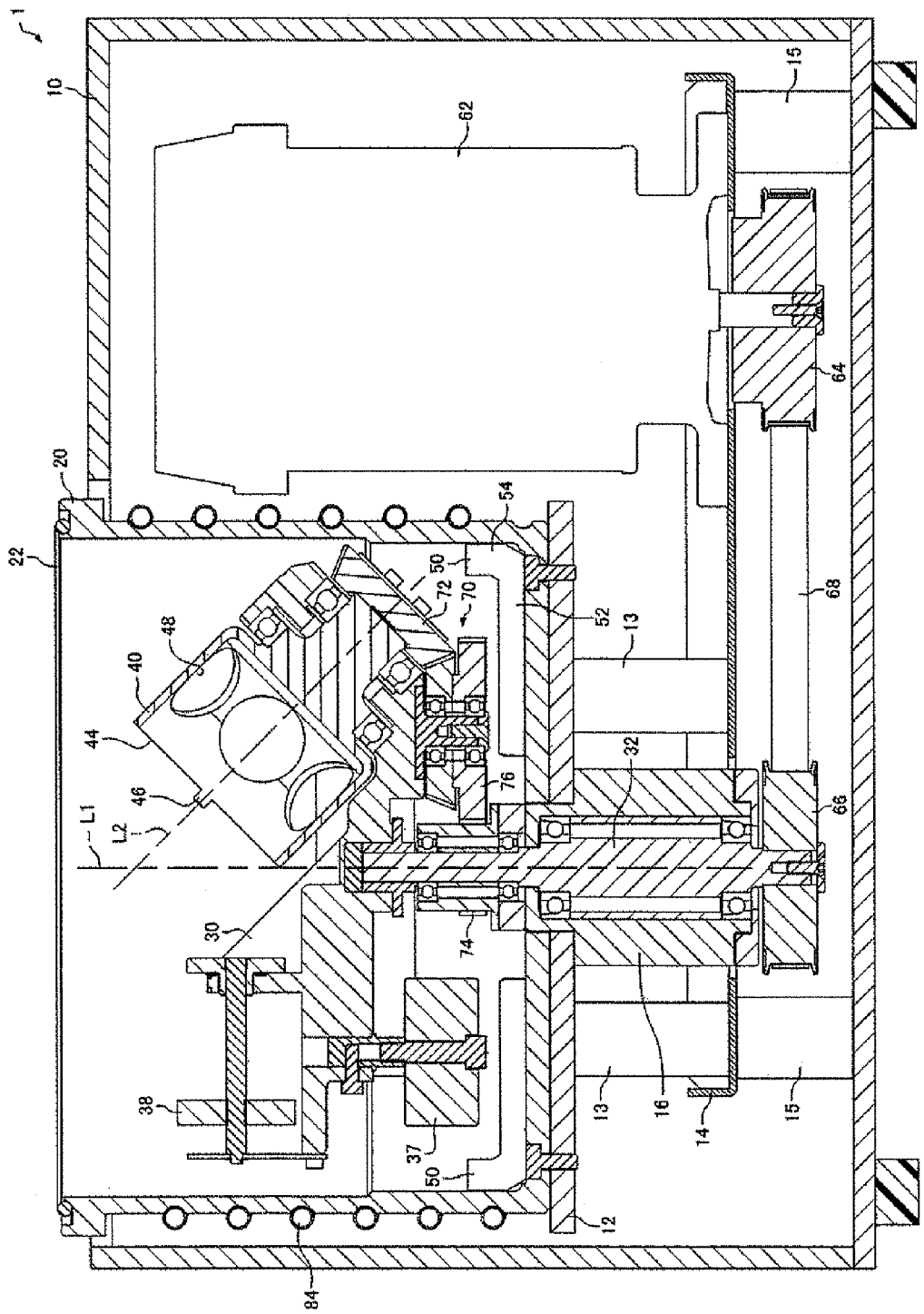
FIG. 1 is a diagram for explaining a centrifuge according to a present embodiment.

As shown in FIG. 1, the centrifuge 1 has a casing 10. The casing 10 is a member that forms an outer shape of the centrifuge land houses therein various mechanisms, described hereafter. The casing 10 has a first supporting substrate 12 and a second supporting substrate 14. The first supporting substrate 12 serves to support a compartment body 20, described hereafter. In addition, a holding member 16 for holding a rotation shaft 32 of a rotating body 30, described hereafter, is fixed to the first supporting substrate 12. The second supporting substrate 14 serves to support the first supporting substrate 12 and a motor 62 (described in detail hereafter). According to the present embodiment, the first supporting substrate 12 is supported by the second supporting substrate 14 with a supporting body 13 therebetween. The second supporting substrate 14 is supported by the casing 10 (bottom surface thereof) with a supporting body 15 therebetween.

(b) Compartment Body 20

As shown in FIG. 1, the centrifuge 1 has the compartment body 20. The compartment body 20 is a member that compartmentalizes a space including an area in which the rotating body 30 rotates. The compartment body 20 has a cover 22 that can be opened and closed. When the cover 22 is opened, a container holder 40 is exposed, and the container 100 can be attached to and detached from the container holder 40. The temperature of the compartment body 20 is adjusted by a temperature adjuster, described hereafter. Therefore, the compartment body 20 is preferably configured by a material having high thermal conductivity.

(c) Rotating Body 30

As shown in FIG. 1, the centrifuge 1 has the rotating body 30. The rotating body 30 can be rotated in relation to the casing 10 (the first supporting substrate 12 and the second supporting substrate 14), around a rotation axis line L1. Specifically, in the centrifuge 1, the rotation shaft 32 is fixed to the rotating body 30, and the rotation shaft 32 is held to the holding member 16 by a bearing. As a result, the rotating body 30 can be rotated in relation to the casing 10.

Figure 2:
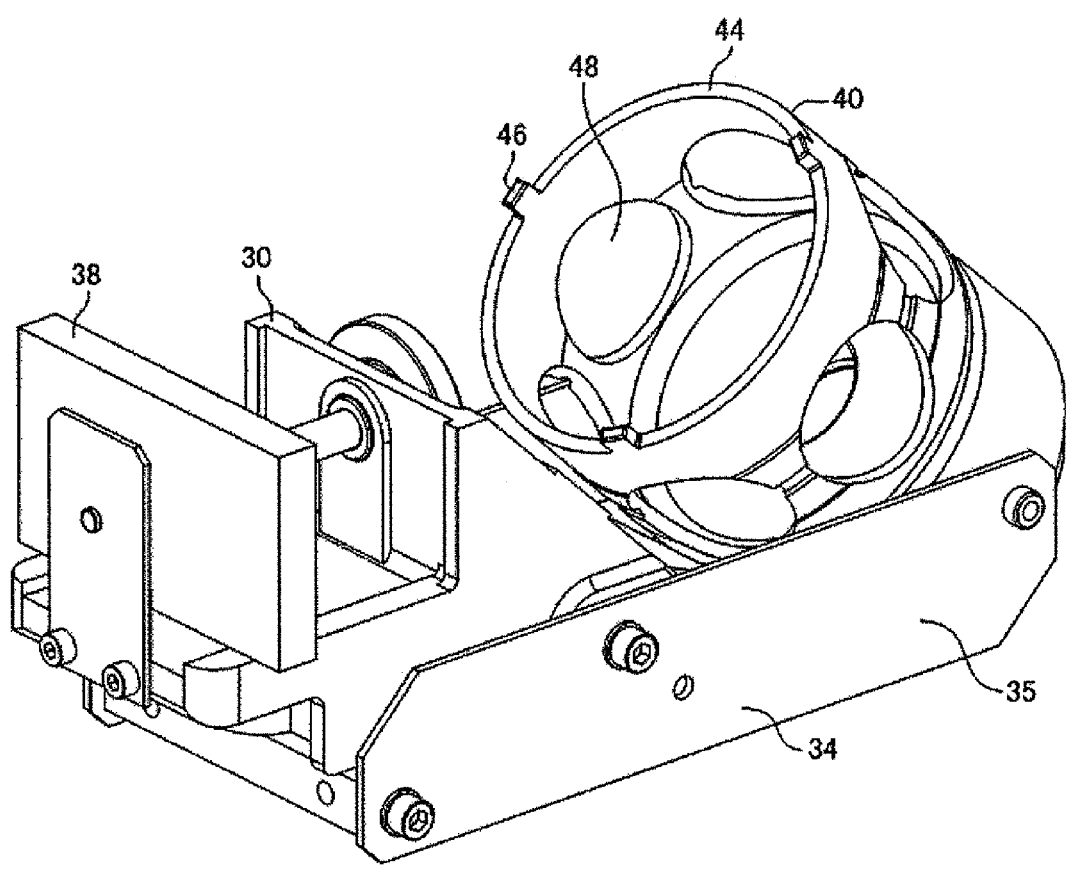
FIG. 2 is a diagram for explaining the centrifuge according to the present embodiment.
Figure 3:
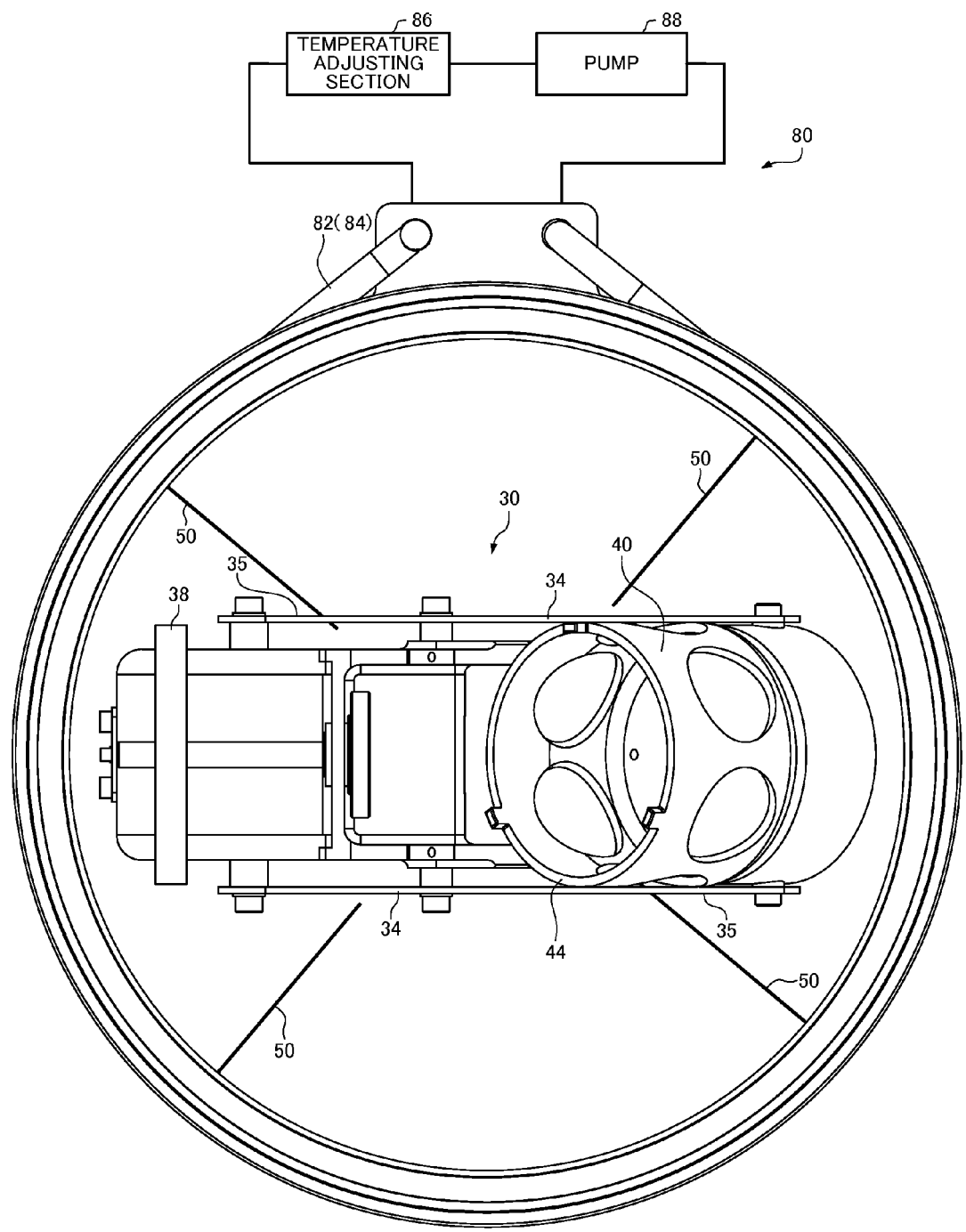
FIG. 3 is a diagram for explaining the centrifuge according to the present embodiment.

As shown in FIG. 2 and FIG. 3, the rotating body 30 has a compressing section 35 that compresses air within the compartment body 20 towards the rotating direction of the rotating body 30. According to the present embodiment, as shown in FIG. 2 and FIG. 3, the rotating body 30 has a plate-shaped member 34 that extends in parallel with an imaginary plane including the rotation axis line L1 and a spinning axis line L2 (described hereafter) (or an imaginary plane including the spinning axis line L2 and extending in parallel with the rotation axis line L1). The compressing section 35 is actualized by a surface of the plate-shaped member 34 facing the rotating direction of the rotating body 30. In other words, in FIG. 3, the rotating direction of the rotating body 30 is the clockwise direction. According to the present embodiment, the compressing section 35 is disposed immediately in front of the container holder 40, described hereafter.

As shown in FIG. 1, a spindle 37 and an adjustment spindle 38 are attached to the rotating body 30. The weight of the spindle 37 and the position of the adjustment spindle 38 are adjusted, thereby enabling the rotating body 30 to rotate stably.

(d) Container Holder 40

As shown in FIG. 1 to FIG. 3, the centrifuge 1 includes the container holder 40. The container holder 40 serves to hold the container 100, described hereafter. The container holder 40 is attached to the rotating body 30 in a position that is a predetermined distance away from the rotation axis line L1. As a result, the container holder 40 revolves around the rotation axis line L1 with the rotation of the rotating body 30.

The container holder 40 is attached such as to be capable of spinning (rotating) in relation to the rotating body 30. Specifically, in the centrifuge 1, as shown in FIG. 1, the container holder 40 is configured such as to be held to the rotating body 30 by a bearing. As a result, the container holder 40 is able to spin in relation to the rotating body 30.

According to the present embodiment, the container holder 40 is configured such that the spinning axis line L2 thereof intersects with the rotation axis line L1 (revolution axis line) at an angle. Specifically, the centrifuge 1 is configured such that the spinning axis line L2 intersects with the rotation axis line L1 at a 45 degree angle. However, the intersection angle between the rotation axis line L1 and the spinning axis line L2 is not limited to 45 degrees and may be set accordingly based on the properties of the contained material M.

The container holder 40 has a container supporting section 44. The container supporting section 44 serves to support the container 100. According to the present embodiment, the container supporting section 44 is actualized by the upper end of the container holder 40 (see FIG. 6A and FIG. 8). According to the present embodiment, the container supporting section 44 supports the container 100 such that the bottom surface of the container 100 is disposed at a distance from the inner bottom surface of the container holder 40 (see FIG. 8). In other words, the container holder 40 is configured such that the distance from the upper end (the container supporting section 44) to the inner bottom surface is longer than the distance from a projecting section 130 of the container 100 (a lower surface of the projecting section 130) to the bottom surface of the container 100.

According to the present embodiment, as shown in FIG. 1 to FIG. 3, the container holder 40 is configured such that three projecting sections 46 are attached. The projecting sections 46 prevent the container 100 from spinning freely within the container holder 40. However, a configuration in which the container holder 40 does not have the projecting sections 46 is also possible (not shown).

According to the present embodiment, as shown in FIG. 1 to FIG. 3, the container holder 40 is configured having a through hole 48 in the side surface. The through hole 48 is formed near the lower end section of the side surface of the container holder 40. As a result, the space between the bottom surface of the container 100 and the inner bottom surface of the container holder 40 can be exposed through the through hole 48 (see FIG. 8). However, as a modified example, the container holder 40 can be formed into a shape that does not have the through hole 48 (not shown).

(e) Projection Body 50

The centrifuge 1 has a projection body 50. The projection body 50 is a member that projects towards the rotating body 30 from the inner surface of the compartment body 20 (an area in which the rotating body 30 rotates). The projection body 50 is provided such as to become close to the rotating body 30 (the area in which the rotating body 30 rotates). The projection body 50 has a shape extending such as to intersect with a circumference of which the rotation axis line L1 is the center. According to the present embodiment, the projection body 50 has a shape extending such as to be perpendicular to the circumference of which the rotation axis line L1 is the center. In addition, according to the present embodiment, the projection body 50 includes a bottom surface section 52 that extends along the bottom surface of the compartment body 20 and a side surface section 54 that extends along the side surface of the compartment body 20. In other words, the projection body 50 is actualized by a plate-shaped body having an L-shape when viewed from the front (see FIG. 3). According to the present embodiment, from a top view, the projection body 50 is disposed in an area including the vicinity of an outer periphery of the compartment body 20 (the space compartmentalized by the compartment body 20). According to the present embodiment, four projection bodies 50 are disposed at an even interval within the compartment body 20.

However, the shape, the arrangement, and the number of projection bodies 50 are not limited thereto. Only a single projection body 50 may be disposed within the compartment body 20. Alternatively, two or more projection bodies 50 may be disposed. The projection body 50 may be configured by only the bottom surface section that extends along the bottom surface of the compartment body 20, or only the side surface section that extends along the side surface of the compartment body 20. In addition, the projection body 50 may be provided on an upper surface of the compartment body 20 (such as the cover 22). Furthermore, the projection body 50 may be formed into a shape extending such as to intersect at an angle with the circumference of which the rotation axis line L1 is the center.

(f) Driving Mechanism

The centrifuge 1 includes a driving mechanism that spins the container holder 40 (the container 100) while revolving the container holder 40. A configuration of the driving mechanism will be described hereafter.

The driving mechanism includes the motor 62. The motor 62 serves to rotate the rotating body 30 (the rotation shaft 32). The motor 62 is configured to rotate the rotation shaft 32 (the rotating body 30) by a pulley 64, a pulley 66, and a belt 68. According to the present embodiment, when the rotating body 30 is rotated, the container holder 40 (the container 100) is revolved. Therefore, the motor 62 can be referred to as a revolution driving mechanism for revolving the container holder 40 (the container 100). Any known motor, such as an induction motor, a servo motor, or a permanent magnet (PM) motor, may be used as the motor 62.

The driving mechanism also has a spinning fore applying mechanism. According to the present embodiment, the spinning force applying mechanism is configured to apply spinning force on the container holder 40 in accompaniment with the revolution of the container holder 40 (the rotation of the rotating body 30). The spinning force applying mechanism will be described hereafter.

The spinning force applying mechanism has a spinning gear 72. The spinning gear 72 is fixed to the container holder 40 and moves integrally with the container holder 40. The spinning force applying mechanism also has a spinning force applying gear 74. The spinning force applying gear 74 is provided concentrically with the rotation shaft 32. According to the present embodiment, the spinning force applying gear 74 is fixed to the casing 10. The spinning force applying mechanism has a spinning power transmitting mechanism 76 that transmits power between the spinning gear 72 and the spinning force applying gear 74. According to the present embodiment, the spinning power transmitting mechanism 76 is actualized by a first relay gear and a second relay gear attached in a rotatable manner to the rotating body 30. The first relay gear and the second relay gear are fixed and rotate at the same rotation frequency.

According to the spinning force applying mechanism, the behavior of the spinning gear 72 and the behavior of the spinning force applying gear 74 are associated by the spinning power transmitting mechanism 76. The spinning gear 72 and the spinning force applying gear 74 behave in a manner similar to a planetary gear mechanism. According to the present embodiment, because the spinning gear 72 is fixed to the casing 10, when the rotating body 30 is rotated, the spinning gear 72 spins around the spinning axis line L2 while revolving around the rotation axis line LI. In other words, in the centrifuge 1, when the motor 62 rotates the rotating body 30, the spinning gear 72 spins while revolving, thereby spinning while revolving the container holder 40 fixed to the spinning gear 72.

As a modified example, the driving mechanism can be configured to enable the spinning force applying gear 74 to rotate in relation to the casing 10. The driving mechanism can be configured to further include an adjustment mechanism for rotating the spinning force applying gear 74 at a desired rotation frequency (not shown). As described earlier, in the driving mechanism, the rotation frequency of the spinning gear 72 and the rotation frequency of the spinning force applying gear 74 are associated by the spinning power transmitting mechanism 76. Therefore, as a result of the rotation frequency of the spinning force applying gear 74 being adjusted while revolving the spinning gear 72 (rotating the rotating body 30), the spinning frequency of the spinning gear 72 can be controlled. The adjustment mechanism can be actualized by any known mechanism, such as a motor or a brake.

As another modified example, a pulley and a belt can be used as a power transmitting element (not shown).

(g) Temperature Adjuster 80

As shown in FIG. 1 and FIG. 3, the centrifuge 1 has a temperature adjuster 80. The temperature adjuster 80 serves to adjust the temperature of the compartment body 20.

According to the present embodiment, the temperature adjuster 80 has a pipe 82. The pipe 82 is a member that configures a flow path for a heat medium (a heating medium or a cooling medium) and has a thermal conversion section 84 wound around the outer periphery of the compartment body 20. The temperature adjuster 80 also has a temperature adjusting section 86 that adjusts the temperature of the heat medium and a pump 88 that moves (circulates) the heat medium. In the temperature adjuster 80, the heat medium of which the temperature has been adjusted by the temperature adjusting section 86 is sent to the thermal conversion section 84 by the pump 88. The heat medium performs thermal conversion with the compartment body 20 while flowing through the thermal conversion section 84, thereby adjusting the temperature of the compartment body 20. The heat medium that has completed thermal conversion is once again temperature-adjusted by the temperature adjusting section 86, sent to the thermal conversion section 84 by the pump 88, and performs thermal conversion with the compartment body 20. As a result of this process being repeated, the compartment body 20 can be adjusted to a desired temperature. According to the present embodiment, a cooler or a heater may be used as the temperature adjuster 80.

(h) Control Means 90

Figure 4:
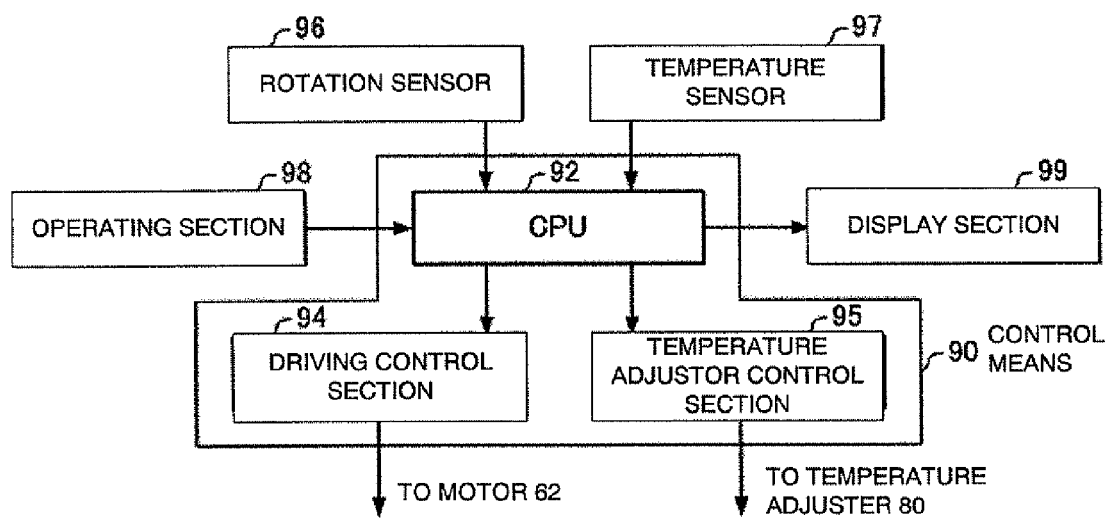
FIG. 4 is a diagram for explaining the centrifuge according to the present embodiment.

As shown in FIG. 4, the centrifuge 1 has a control means 90. The control means 90 serves to perform overall control of the operations of the centrifuge 1. The control means 90 will be described hereafter.

The control means 90 includes a microprocessor (central processing unit [CPU] 92), a driving control section 94 that controls operation of the driving mechanism (motor 62), and a temperature adjuster control section 95 that controls operation of the temperature adjuster 80. The CPU 92 outputs various signals to the driving control section 94 and the temperature adjuster control section 95 based on operation data (such as data inputted by the user in adherence to processing conditions of the contained material M), thereby controlling operation of the centrifuge 1.

As described above, in the centrifuge 1, the container holder 40 revolves in accompaniment with the rotation of the rotating body 30. Therefore, as a result of the output of the motor 62 being controlled, the revolution frequency of the container holder 40 is controlled. In other words, as a result of the output of the motor 62 being controlled, the container holder 40 can be revolved at a desired revolution frequency.

For example, when an induction motor is used as the motor 62, the driving control section 94 can be actualized by an inverter control section that controls operation of an inverter and sets the frequency of alternating current power supplied to the motor 62 to a predetermined value. Alternatively, when a servo motor is used as the motor 62, the driving control section 94 can be actualized by a dedicated driver and hardware, and can perform various processes for operating the motor 62 at a desired rotation frequency. In addition, the driving control section 94 can be configured to acquire (such as by the CPU 92) rotation frequency information of the container holder 40 detected by a rotation sensor 96, and perform various processes to adjust the rotation frequency of the rotating body 30 based on the acquired rotation frequency information.

In addition, in the centrifuge 1, the operation of the temperature adjuster 80 is determined by the operations of the temperature adjusting section 86 and the pump 88 being controlled. In other words, the temperature adjuster 80 can be operated as desired by the setting temperature of the temperature adjusting section 86 and the operation of the pump 88 being controlled. Therefore, according to the present embodiment, the temperature adjuster control section 95 can be configured to have a temperature control section that adjusts the setting temperature by controlling the operation of the temperature adjusting section 86 and the pump control section that controls the operation of the pump 88.

The CPU 92 performs a process for transmitting various signals (such as target rotation frequency data of the container holder 40 and target temperature data of the compartment body 20) to the driving control section 94 and the temperature adjuster control section 95 at a predetermined timing. As a result, the compartment body 20 can be adjusted to a desired temperature while rotating the container holder 40 at a desired rotation frequency.

According to the present embodiment, the CPU 92 is configured to be capable of acquiring the rotation frequency information of the rotating body 30 (rotation frequency information of the container holder 40) via the rotation sensor 96. The CPU 92 can perform a process for storing the rotation frequency information in a storage section (not shown) in association with elapsed time. In addition, the CPU 92 can be configured to perform a calculation process of the spinning frequency information of the container holder 40 based on the rotation frequency information of the rotating body 30. In other words, in the centrifuge 1, because the spinning force applying gear 74 is configured so as not to rotate, if the rotation frequency of the rotating body 30 is known, the spinning frequency of the container holder 40 can be calculated using a coefficient derived from size data of each element (power transmitting element) of the power transmitting mechanism.

In addition, the CPU 92 is configured to be capable of acquiring temperature information of the compartment body 20 via a temperature sensor 97. The CPU 92 can perform a process for storing the temperature information in the storage section (not shown) in association with elapsed time. In addition, the CPU 92 can be configured to perform a calculation process for deriving data to be transmitted to the temperature adjustor control section 95 based on the temperature information and setting temperature information of the compartment 20. The temperature sensor 97 can also be configured to acquire temperature information of the container holder 40 or the contained material M, rather than the temperature information of the compartment body 20.

In addition, the CPU 92 receives operation data inputted from an operating section 98, and performs a process for storing the operation data in the storage section (not shown), and a process for displaying various pieces of information (such as operation data inputted from the operating section 98 and an operation state of the centrifuge 1) in a display section 99.

(2) Container 100

Figure 5A:
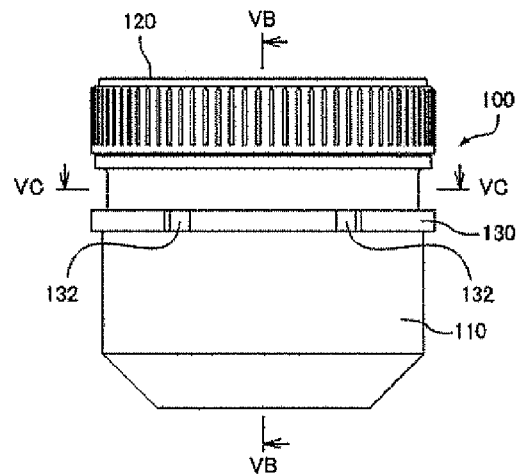
FIG. 5A to FIG. 5C are diagrams for explaining a container applicable according to the present embodiment.
Figure 5B:
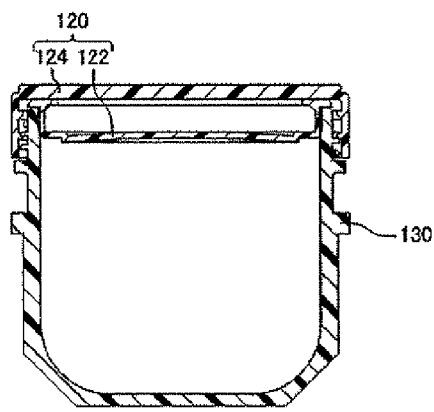
Figure 5C:
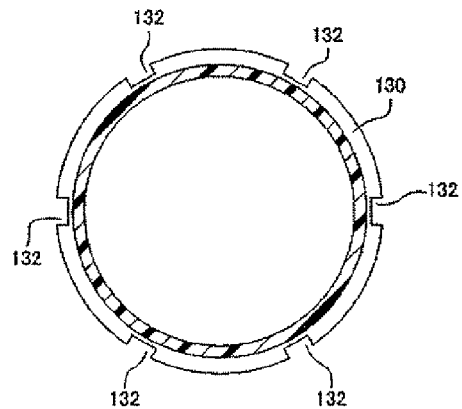
Figure 6A:
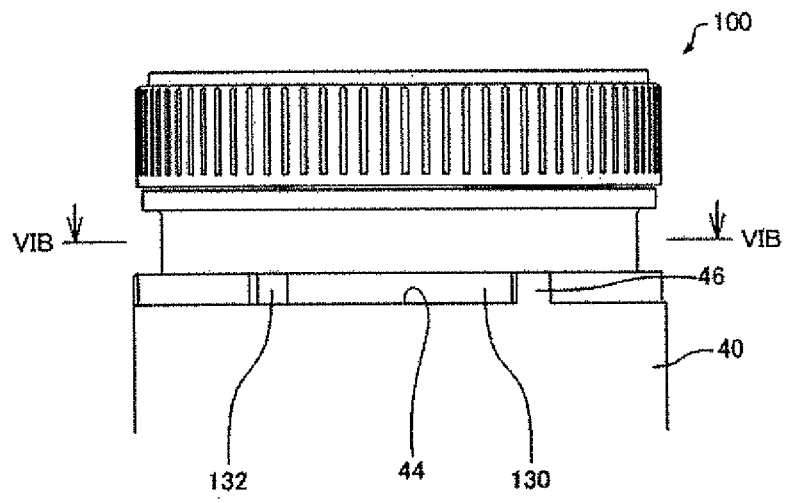
FIG. 6A and FIG. 6B are diagrams for explaining the container applicable according to the present embodiment.

Next, the container 100 applicable according to the present embodiment will be described with reference to FIG. 5A to FIG. 6B. Here, FIG. 5A is a side view of the container 100. FIG. 5B is a cross-sectional view taken along line VB-VB in FIG. 5A. FIG. 5C is a cross-sectional view taken along line VC-VC in FIG. 5A. FIG. 6A is a partially enlarged view of a side surface in a state in which the container 100 is held in the container holder 40. FIG. 5B is a cross-sectional view taken along line VIB-VIB in FIG. 6A.

The container 100 includes a container main body 110 and a lid body 120. The container main body 110 serves to contain the contained material M therein. The material of the container main body 110 is not particularly limited and can be selected accordingly in adherence to the intended purpose. Any known container, such as that made of resin, metal, glass, zirconia, can be applied as the container main body 110. The lid body 120 serves to seal an opening of the container main body 110. According to the present embodiment, the lid body 120 includes an inner lid 122 and an outer lid 124. As a modified example, the contained material M can be processed without using the lid body 120 (not shown).

The container 100 has a projecting section 130. The projecting section 130 is configured to project from the outer side surface of the container main body 110. As shown in FIG. 6A, when the container 100 is held by the container holder 40, the projecting section 130 comes into contact with the container supporting section 44 of the container holder 40. In other words, the container 100 is configured to be supported by the container holder 40 by the projecting section 130.

Figure 6B:
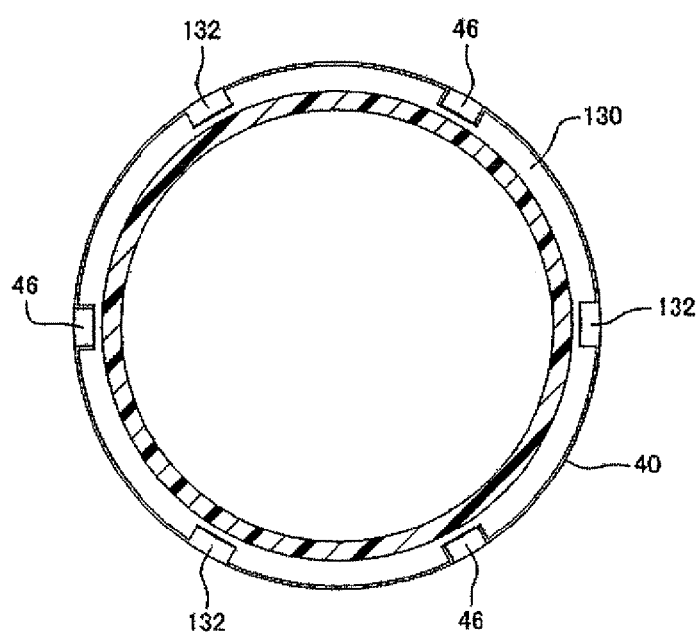

The container 100 has a free-spinning preventing mechanism. The free-spinning preventing mechanism serves to prevent the container 100 from spinning freely within the container holder 40. In other words, as a result of the free-spinning preventing mechanism, the container 100 can be held by the container holder 40 and move integrally with the container holder 40. According to the present embodiment, as shown in FIG. 5A and FIG. 5C, the free-spinning preventing mechanism is actualized by a recessing section 132 provided on the outer periphery of the projecting section 130. In other words, according to the present embodiment, as shown in FIG. 6A and FIG. 6B, the projecting section 46 of the container holder 40 is engaged with the recessing section 132, thereby preventing the container 100 from spinning freely within the container holder 40.

(3) Contained Material M

The contained material M applicable according to the present embodiment is not particularly limited in terms of composition and intended purpose as long as the contained material M behaves as a fluid. As the contained material M, a material containing only a fluid component (such as resin), a material containing a particle component (powder component) in addition to the fluid component, and the like can be applied. As the contained material M, for example, various materials such as an adhesive, a sealant, a liquid crystal material, a mixed material containing a fluorescent substance of a light-emitting diode (LED) and resin, soldering paste, dental image material, dental cement (such as filler), and liquid medication can be applied. In addition, as the contained material M, a granular (powder) material and a medium (such as zirconia balls) for grinding the material may be applied. Alternatively, as the contained material M, a fluid to be emulsified may be applied.

(4) Method of Processing Contained Material M

Next, a method of processing the contained material M according to the present embodiment will be described with reference to FIG. 7. FIG. 7 is a flowchart for explaining the method of processing the contained material M.

As shown in FIG. 7, the method of processing the contained material M includes: a step of holding the container 100 containing the contained material M in the container holder 40 (Step S110); a step of adjusting the compartment body 20 to a desired temperature (Step 120); and a step of applying centrifugal force on the contained material M by spinning the container holder 40 (the container 100) while revolving the container holder 40 (Step S130). As a result, the centrifugal force is applied on the contained material M contained within the container 100, and the contained material M is processed (stirred, defoamed, grinded, emulsified, or the like). FIG. 8 schematically shows a state in which the contained material M is being processed.

According to the present embodiment, the step of adjusting the compartment body 20 to a desired temperature (Step S120) can be performed in a state in which the rotating body 30 is stopped, or while the rotating body 30 is being rotated. The setting temperature of the compartment body 20 can be set accordingly in adherence to processing conditions of the contained material M and the intended purpose. Specific values can be derived, for example, through testing.

In addition, in the step of applying the centrifugal force on the contained material M (Step S130), the rotation frequency of the container 100 (the rotation frequency of the rotating body 30) and the operation time are set accordingly in adherence to the processing conditions of the contained material M and the intended purpose. Specific values can be derived through testing. For example, the rotation frequency of the rotating body 30 can be set to about 2000 rpm, and the operating time can be set to several minutes to several tens of minutes.

(5) Operational Effects

Operational effects of the centrifuge 1 according to the present embodiment will be described hereafter.

Figure 9:
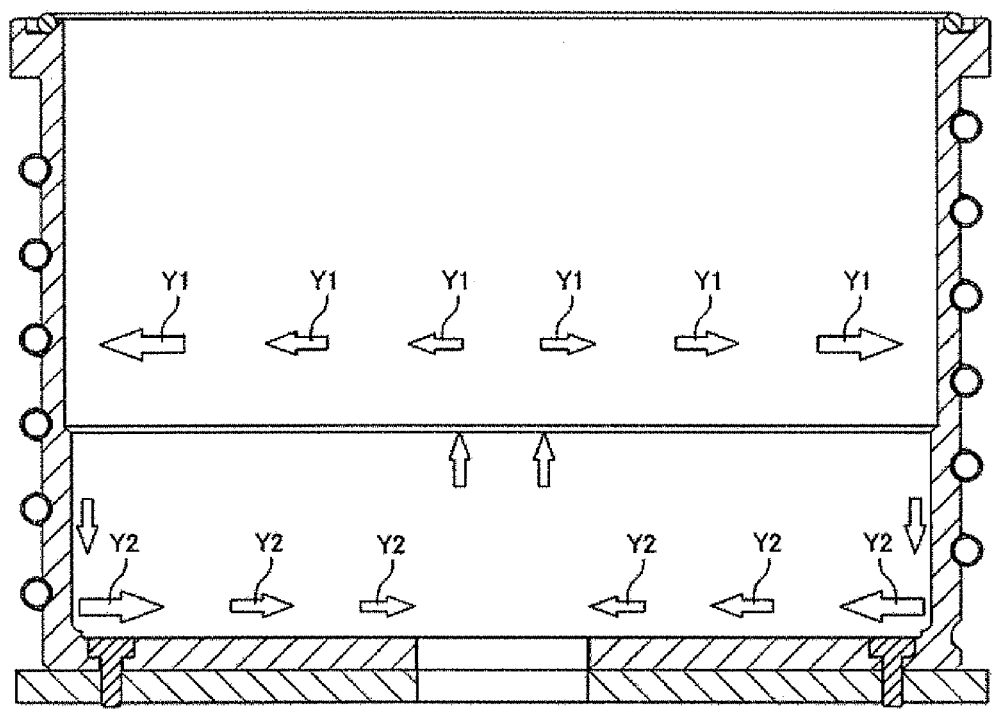
FIG. 9 is a diagram for explaining operational effects according to the present embodiment.
Figure 10:
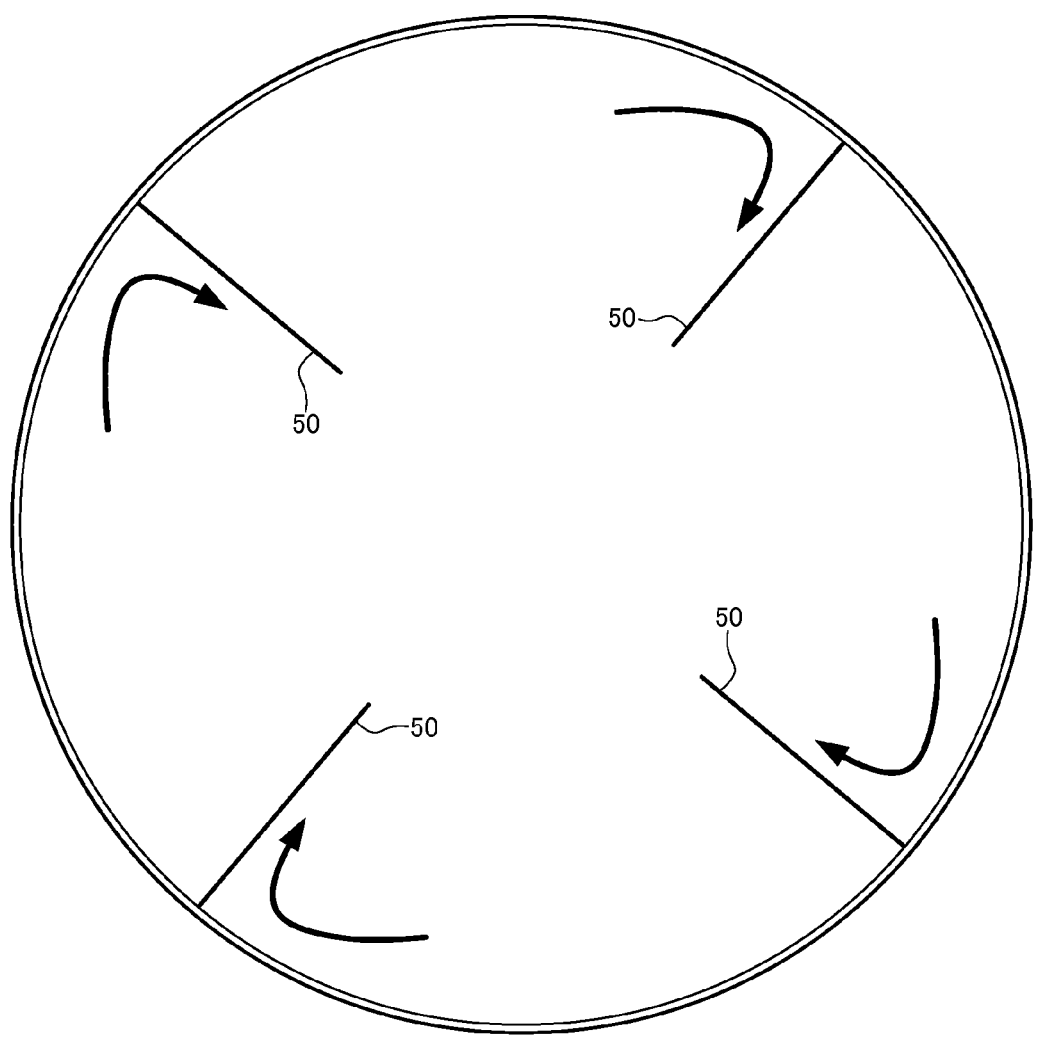
FIG. 10 is a diagram for explaining the operational effects according to the present embodiment.

According to the centrifuge 1, as a result of the temperature of the compartment body 20 being adjusted, the temperature of the contained material M can be efficiently adjusted during rotation of the rotating body 30. Hereafter, the operation will be described. FIG. 9 and FIG. 10 are diagrams for describing the operational effects.

When the rotating body 30 rotates within the compartment body 20, the air within the compartment body 20 rotates around the rotation axis line L1 in accompaniment with the rotation of the rotating body 30. Because centrifugal force is applied on the rotating air, the air within the compartment body 20 moves in the direction towards the outer periphery of the compartment body 20 (the direction indicated by arrow Y1 in FIG. 9) from the rotation axis line L1 while moving in the circumferential direction of a circle of which the rotation axis line L1 is the center. In other words, when the centrifuge 1 does not have the projection body 50, the movement of air in the radial direction of the compartment body 20 (specifically, the radial direction of the circle of which the center is the rotation axis line L1) within the compartment body 20 becomes only movement in the direction away from the rotation axis line L1.

According to the present embodiment, because the temperature adjuster 80 adjusts the temperature of the compartment body 20, only the air present near the compartment body 20 is adjusted among the air within the compartment body 20. When the movement of air within the compartment body 20 in the radial direction is only in the direction away from the rotation axis line L1 (when the air only flows in the direction indicated by arrow Y12 in FIG. 9), the air of which the temperature has been adjusted near the compartment body 20 cannot move towards the inner side (the rotation axis line L1) of the compartment body 20, and remains near the outer periphery of the compartment body 20. Therefore, efficient adjustment of the temperature of the contained material M within the container 100 is difficult.

On the other hand, according to the present embodiment, the centrifuge 1 includes the projection body 50. As a result, the temperature of the contained material M within the container 100 can be efficiently adjusted.

In other words, according to the present embodiment, the air within the component body 20 flows with the rotation of the rotating body 30, and strikes the projection body 50. The air that has struck the projection body 50 is blocked from moving in the rotating direction of the rotating body 30. Therefore, as shown in FIG. 10, the air moves towards the inner side (the rotation axis line L1) of the compartment body 20 along the projection body 50. In other words, near the projection body 50 (particularly near the flat surface of the projection body 50 facing the direction opposite of the rotating direction of the rotating body 30), a flow of air is generated that moves towards the rotation axis line L1 (arrow Y2 in FIG. 9). The air that has moved near the rotation axis line L1 starts to flow in accompaniment with the rotation of the rotating body 30, and movement towards the outer periphery of the compartment body 20 is started. In the vicinity of the outer periphery of the compartment body 20, the pressure near the projection body 50 decreases (negative pressure is generated). Therefore, a flow of air is generated that moved towards the projection body 50 along the inner surface of the compartment body 20. As a result of this phenomenon occur continuously, as schematically shown in FIG. 9, a convection current is generated in the compartment body 20 in which a flow from the rotation axis line L1 towards the outer periphery of the compartment body 20 (arrow Y1) and a flow from the outer periphery of the compartment body 20 towards the rotation axis line L1 (arrow Y2) are both present. In other words, according to the centrifuge 1, the air within the compartment body 20 moves in the radial direction of the compartment body 20 by the rotating body 30 being rotated. As a result, the temperature of the compartment body 20 can be transmitted within the space compartmentalized by the compartment body 20 (the container 100) through air. Thus, the temperature of the contained material M within the container 100 can be efficiently adjusted.

In particular, according to the present embodiment, the container holder 40 of the centrifuge 1 supports the container 100 such that the bottom surface of the container 100 is disposed at a distance from the inner bottom surface of the container holder 40. In addition, the through hole 48 that exposes the space between the bottom surface of the container 100 and the inner bottom surface of the container holder 40 is formed in the side surface of the container holder 40 (see FIG. 8). As a result, the frequency of contact between the air within the compartment body 20 (the air of which the temperature has been adjusted by the compartment body 20) and the container 100 can be increased, thereby enabling the temperature of the container 100 (the contained material M) to be efficiently adjusted.

In addition, according to the present embodiment, the rotating body 30 of the centrifuge 1 is configured to have the compressing section 35 that compresses the air within the compartment body 20. Therefore, the air can be efficiently sent in the rotating direction of the rotating body 30 within the compartment body 20, and temperature adjustment efficiency of the air within the compartment body 20 can be enhanced.

(6) Confirmation of the Effects

To confirm the effects of the present invention, the temperatures were measured for a material and the compartment body 20 before and after material processing, in an instance in which the projection body 50 is included and an instance in which the projection body 50 is not included, using NP-100 manufactured by THINKY Corporation. In the experiment, as shown in FIG. 1 and FIG. 3, four projection bodies 50 were arranged at even intervals. In addition, in the experiment, a cooling device was used as the temperature adjuster 80. The measurement results are shown in

TABLE 1

|  |  | TEMPERATURE BEFORE PROCESSING | TEMPERATURE AFTER PROCESSING | TEMPERATURE DIFFERENCE |
|---|---|---|---|---|
| WITHOUT PROJECTION BODIES 50 | MATERIAL | 24.3 | 21.2 | −3.1 |
|  | COMPARTMENT BODY | −17.3 | −17.2 | 0.1 |
| WITH PROJECTION BODIES 50 | MATERIAL | 20.9 | 13.5 | −7.4 |
|  | COMPARTMENT BODY | −21.3 | −19.2 | 2.1 |

When the measurement results of the two instances are studied, in the instance in which the projection bodies 50 are not included, the material temperature has decreased by 3.1° C. before and after processing, whereas in the instance in which the projection bodies 50 are included, the material temperature has decreased by 7.4° C. before and after processing. Therefore, the effect of reducing material temperature is clearly superior in the instance in which the projection bodies 50 are included. In addition, when the measurement results of the two instances are studied, in the instance in which the projection bodies 50 are not included, the temperature of the compartment body 20 has increased by 0.1° C. before and after processing, whereas in the instance in which the projection bodies 50 are included, the temperature of the compartment body 20 has increased by 2.1° C. before and after processing. Therefore, the thermal conversion between the compartment body 20 and air is clearly more efficiently performed in the instance in which the projection bodies 50 are included.

The invention claimed is:

1. A centrifugal device that applies centrifugal force on a contained material contained within a container by spinning the container while rotating the container, the centrifugal device comprising:
   a rotating body configured to be capable of rotating around a predetermined rotation axis line;
   a container holder that holds the container and is attached in a rotatable manner to the rotating body in a position that is a predetermined distance away from the rotation axis line of the rotating body;
   a compartment body that compartmentalizes a space including an area in which the rotating body rotates;
   one or a plurality of projection bodies that project from an inner surface of the compartment body towards the area; and
   a temperature adjustor that adjusts the temperature of the compartment body,
   wherein the projection body has a flat surface that faces in a direction opposite to a rotating direction of the rotating body.

2. The centrifugal device according to claim 1, wherein the rotating body has a compressing section that compresses air within the space towards the rotating direction of the rotating body.

3. The centrifugal device according to claim 2, wherein the projection body has a shape that extends such as to intersect with a circumference of which the center is the rotation axis line.

4. The centrifugal device according to claim 3, wherein the projection body is disposed near an outer periphery of the space.

5. The centrifugal device according to claim 4, wherein the projection body is near the area.

6. The centrifugal device according to claim 3, wherein the projection body is near the area.

7. The centrifugal device according to claim 2, wherein the projection body is disposed near an outer periphery of the space.

8. The centrifugal device according to claim 7, wherein the projection body is near the area.

9. The centrifugal device according to claim 2, wherein the projection body is near the area.

10. The centrifugal device according to claim 1, wherein the projection body has a shape that extends such as to intersect with a circumference of which the center is the rotation axis line.

11. The centrifugal device according to claim 10, wherein the projection body is disposed near an outer periphery of the space.

12. The centrifugal device according to claim 11, wherein the projection body is near the area.

13. The centrifugal device according to claim 10, wherein the projection body is near the area.

14. The centrifugal device according to claim 1, wherein the projection body is disposed near an outer periphery of the space.

15. The centrifugal device according to claim 14, wherein the projection body is near the area.

16. The centrifugal device according to claim 1, wherein the projection body is near the area.

17. The centrifugal device according to any one of claims 1 to 15, wherein a through hole is formed in a side surface of the container holder.

18. The centrifugal device according to claim 17, wherein:
   the container holder has a container supporting section that supports the container such that a bottom surface of the container is disposed at a distance from an inner bottom surface of the container holder; and
   the through hole in the container holder exposes space between the bottom surface of the container and the inner bottom surface of the container holder.

19. The centrifugal device according to claim 18, wherein the container supporting section is an upper end of the container holder.

20. The centrifugal device according to claim 1, wherein
the centrifugal device comprises two or more projection bodies;
each of the flat surfaces of the two or more projection bodies has at least two linear sides; and
one linear side of each of the flat surfaces is in contact with a lateral inner surface of the compartment body and the other linear side of each of the flat surfaces is in contact with a bottom inner surface of the compartment body.

21. The centrifugal device according to claim 1, wherein
the centrifugal device comprises two or more projection bodies;
each of the flat surfaces of the two or more projection bodies has an L-shape as viewed in a direction perpendicular to the rotation axis line; and
one linear side of the L-shape is in contact with a lateral inner surface of the compartment body and another linear side of the L-shape is in contact with a bottom inner surface of the compartment body.

22. The centrifugal device according to claim 1, wherein
the centrifugal device comprises two or more projection bodies;
each of the flat surfaces of the two or more projection bodies has an L-shape as viewed in a direction perpendicular to the rotation axis line;
one linear side of the L-shape is in contact with a lateral inner surface of the compartment body and another linear side of the L-shape is in contact with a bottom inner surface of the compartment body; and
each of the flat surfaces is located in perpendicular to a circumference that has a center at the same place as the rotation axis line.

* * * * *